UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

CONDENSATION PRODUCT.

1,215,072.     Specification of Letters Patent.     Patented Feb. 6, 1917.

No Drawing.     Application filed January 2, 1915. Serial No. 267.

*To all whom it may concern:*

Be it known that I, CHARLES P. STEINMETZ, a citizen of the United States, residing at Schenectady, county of Schenectady, State of New York, have invented certain new and useful Improvements in Condensation Products, of which the following is a specification.

The present invention relates to synthetic resinous compositions and its object is to produce resins which are non-inflammable and will withstand a relatively high temperature without decomposition.

My invention comprises products made by the chemical interaction or condensation of halogenated bodies, such as halogenated phenol and substances combining therewith to form resins, such, for example, as aldehydes or compounds containing an aldehyde group.

The following specific examples are illustrative of my invention: About 183 parts of monobromphenol or about 136 parts of monochlorphenol, are admixed with about 75 to 100 parts of a 40% formaldehyde solution and this mixture is heated in a suitable container provided with a reflux condenser preferably in the presence of a suitable amount of catalyzer, such, for example, as about 5 to 10% of hexamethylenetetramin. A fusible resin is formed as a result of this reaction which proceeds in the usual manner as well understood in the manufacture of phenolic resins. Other methods now employed for making phenolic resins may likewise be used. For example, the formaldehyde may be introduced in a gaseous state into the heated halogenphenol in sufficient amounts to produce a fusible, soluble resin. This resin may be hardened by the addition of suitable quantities of hexamethylenetetramin, as well understood.

The resin has essentially the same properties as the resin formed from phenol and formaldehyde except that it is practically non-inflammable. It is highly resistant to chemical reagents, can be made infusible by heating and has a high carbonization temperature.

Other halogen derivatives, for example, the chlorin compounds may be used in place of the bromin compound. Bibromphenol and other compounds of greater halogen content than the mono compounds may likewise be used.

It will also of course be understood that in place of formaldehyde various other compounds containing an aldehyde radical for example, other aldehydes or other compounds such as hexamethylenetetramin may be used, and that similarly halogen substitution products of other phenolic compounds may be used, for example substitution products of cresol, naphthol, etc.

When it is desired to obtain products containing a lower halogen content than the compound resulting by the use of monohalogen compounds, a mixture of halogenated and non-halogenated phenols and their equivalents may be used; as a rule 5 to 10% of halogen in the product imparts substantial non-inflammability, although of course greater percentages may be used.

The improved resins made in accordance with my invention are of particular utility for insulating electrical devices by reason of their non-inflammability, high carbonization temperature and high dielectric strength but they may be used to advantage for other purposes, for example, for impregnating cloth, paper, wood and similar organic materials to render them waterproof and non-inflammable.

What I claim as new and desire to secure by Letters Patent of the United States, is,—

1. A non-inflammable resin consisting of the condensation product of a halogenated phenolic body and a substance containing an aldehyde group.

2. A non-inflammable resin consisting of the condensation product of monochlorphenol and formaldehyde.

3. A new composition of matter consisting of a resinous, non-inflammable condensation product of a halogenated phenol and formaldehyde.

In witness whereof, I have hereunto set my hand this 30th day of December, 1914.

CHARLES P. STEINMETZ.

Witnesses:
BENJAMIN B. HULL,
MARGARET E. WOOLLEY.